Figure 1:
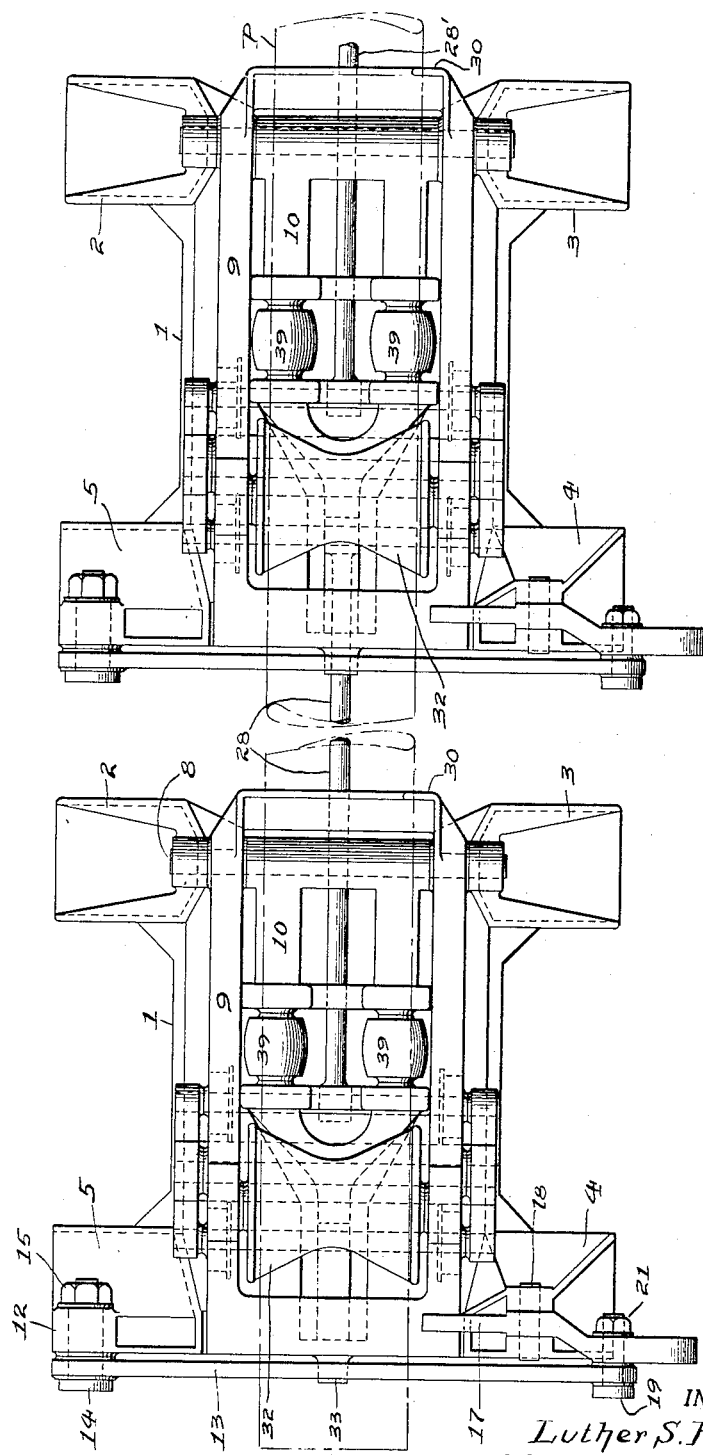

Sept. 26, 1933.  L. S. RESSER  1,927,847

MILL TABLE

Filed Sept. 17, 1930  4 Sheets-Sheet 1

INVENTOR.
Luther S. Resser
BY
ATTORNEYS.

Sept. 26, 1933.　　　L. S. RESSER　　　1,927,847
MILL TABLE
Filed Sept. 17, 1930　　　4 Sheets-Sheet 2

INVENTOR.
Luther S. Resser.
BY
ATTORNEYS.

Sept. 26, 1933.  L. S. RESSER  1,927,847
MILL TABLE
Filed Sept. 17, 1930  4 Sheets-Sheet 3

INVENTOR.
Luther S. Resser.
BY
ATTORNEYS.

Sept. 26, 1933. L. S. RESSER 1,927,847
MILL TABLE
Filed Sept. 17, 1930 4 Sheets-Sheet 4
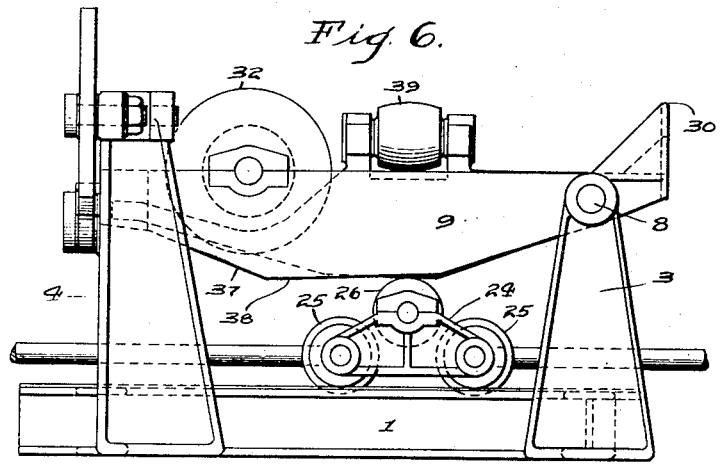
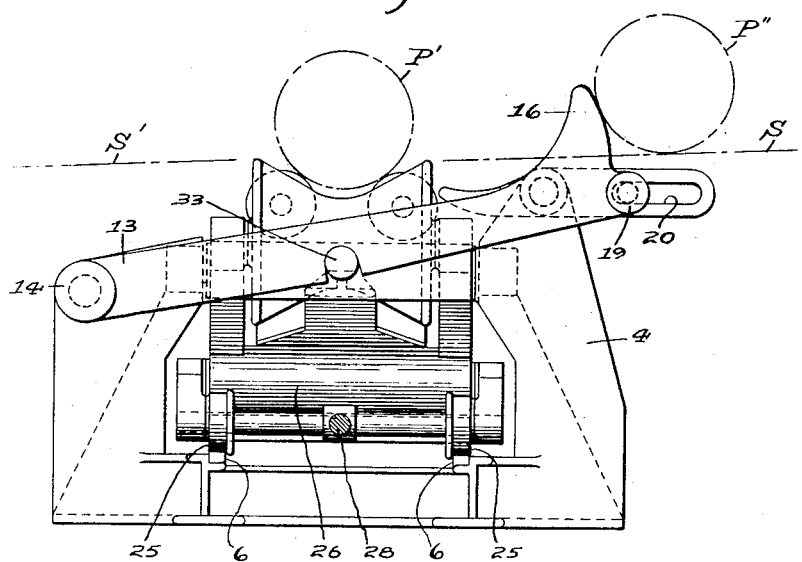
INVENTOR.
Luther S. Resser.
BY
ATTORNEYS.

Patented Sept. 26, 1933

1,927,847

UNITED STATES PATENT OFFICE 1,927,847

MILL TABLE

Luther S. Resser, Youngstown, Ohio

Application September 17, 1930
Serial No. 482,451

13 Claims. (Cl. 80—43)

My invention relates to a mill table adapted to support rolling mill products, pipes and the like in the desired relation to a machine or other apparatus which is to operate thereon and is more particularly adapted to so support pipe, round or polygonal bars and the like which frequently have to be shifted both longitudinally and rotatively during or between the operations of the machine performing work thereon and which are of a relatively heavy nature.

In ordinary rolling mill practice it is often desirable, and in fact, sometimes practically essential that some form of support for mill products and the like be provided which will permit the operator to move the work piece in several directions and, for economy, it is of course desirable that these movements may be effected with but a minimum of labor and relatively quickly.

A principal object of my invention therefore is to provide a mill table adapted to receive and support an elongated cylindrical or polygonal article and which will enable the said article to be shifted with relative ease while it is disposed on the table so that it may be brought to a desired position, as for example, with relation to a machine by means of which certain work is to be, or is being, performed thereon.

A further object of my invention is to provide a table to which the pipes or articles upon which the work is to be done may be successively delivered automatically and then automatically and successively discharged therefrom after the work has been completed.

A further object of my invention is to provide a mill table adapted to receive elongated articles such as pipes, shafts and the like which is operative to permit the article to be rotated with relative ease while on the table, or if desired, to permit it to be shifted longitudinally, yet which nevertheless provides firm and substantial vertical support to the article at all times while disposed thereon.

A still further object of my invention is to provide a table of the class described adapted to support an elongated article at several points on its length and preferably comprising a plurality of units operable in synchronism whereby the various desired movements of the article may be effected through the medium of the several units regardless of the length of the article.

Other purposes, objects and advantages of my invention as well as novel features of design and construction incident thereto are hereinafter more particularly mentioned or will be apparent from the following description of a preferred embodiment thereof as illustrated in the accompanying drawings.

Figure 2:
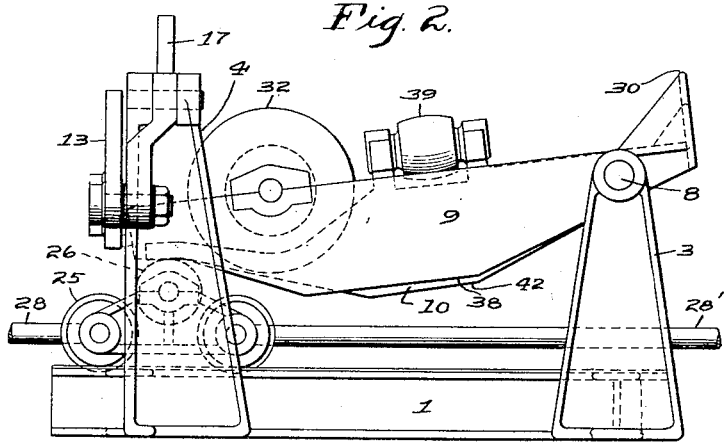
Figure 3:
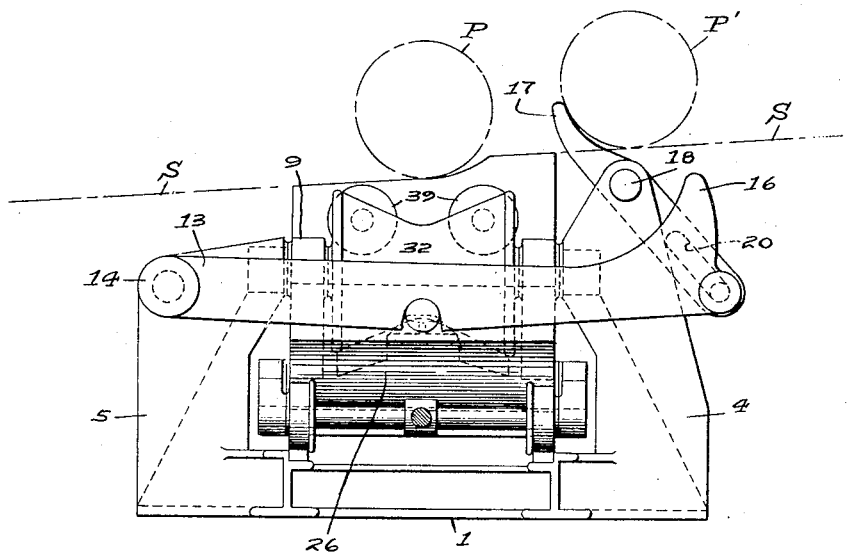
Figure 4:
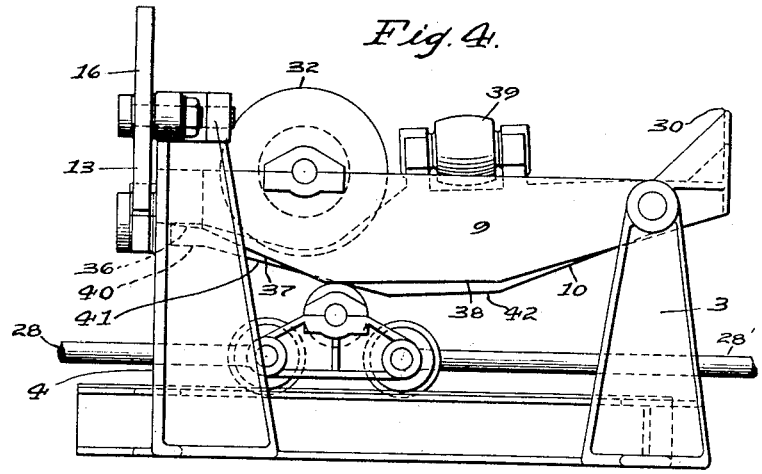
Figure 5:
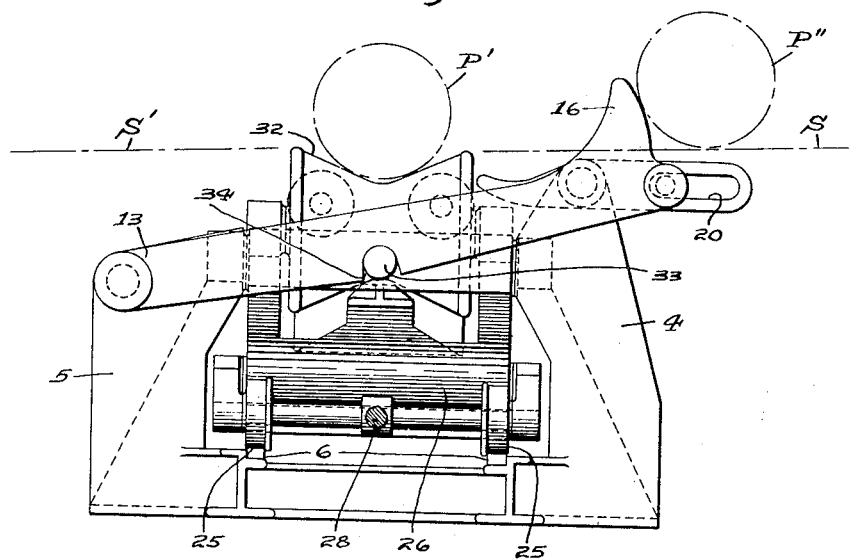

In the said drawings Fig. 1 is a top plan view of a mill table constructed in accordance with the invention and comprising two units and therefore adapted to support an article at two points on its length; Fig. 2 is a side elevation of one of the units shown in Fig. 1 in position for discharging a pipe or other article disposed thereon preparatory to receiving a succeeding article; Fig. 3 is an end elevation of the unit in the position shown in Fig. 2 and indicating in broken lines skids at the opposite sides of the table, pipes being respectively disposed on the skids and on the table; Fig. 4 is a side elevation corresponding to Fig. 2 but showing the table unit in a position to permit a pipe disposed thereon to be shifted longitudinally; Fig. 5 is an end view of the unit in the position shown in Fig. 4, broken lines here also, as in Fig. 3, indicating the skids and pipes; Fig. 6 is a side elevation corresponding to Fig. 4 but showing the unit in position to permit the pipe to be rotated about its axis, and Fig. 7 is an end view of the same with the pipes and skids also shown in broken lines. In the several figures like characters are used to indicate the same parts.

Referring now more particularly to the drawings, it will be understood that while I prefer to employ in each mill table two identical table units, one of which is hereinafter particularly described, but a single unit or any greater number of such units may be utilized as desired. Thus each unit comprises a base 1 with which may desirably be cast integrally a pair of spaced pedestals 2 and 3 disposed in transverse alignment at one end thereof and another pair of spaced pedestals 4 and 5 similarly disposed at the other end. Between the pedestals of each pair, the base 1 supports a pair of rails or tracks 6 extending longitudinally of the base and at the upper ends of the pedestals 2 and 3 and supported thereby is disposed a horizontal shaft 8 which pivotally supports one end of each of two frames 9 and 10 hereinafter more particularly described.

The pedestal 5 is provided with a boss 12 to which a lever arm 13 is pivotally secured by a bolt 14 and nut 15, the arm 13 extending transversely of the table unit and being provided at its free end with a toe 16. A trigger bar 17 is pivotally supported on the pedestal 4 by a pin 18, and is loosely connected to the arm 13 by a bolt 19 extending through a slot 20 in the trigger bar and preferably threaded into the arm 13 and held in place by a suitable lock nut 21.

Disposed beneath the frames 9 and 10 and longitudinally movable along the tracks 6 I provide a small carriage 24 supported on wheels 25 engaging the tracks. A roller 26, adapted to engage the frames 9 and 10, is rotatably disposed on the carriage 24, and a longitudinal shaft 28 is provided for interconnecting the carriage 24 with the corresponding carriage of an adjacent table unit and/or with suitable actuating means (not shown) adapted to move the carriages longitudinally on the tracks.

The frame 9, which may preferably be a single casting, is provided with an upwardly extending horizontally inclined portion 30 adjacent but beyond the pivotal axis of the frame and operative to serve as a skid for discharging an article from the table, while a concave roller 32 is rotatably supported by the frame 9 adjacent its opposite or free end, the axis of the roller extending transversely of the frame. At the extreme end of the latter is formed an integral lug 33 adapted to be received in a recess 34 in the arm 13 whereby movement of the frame 9 is effective to move the arm 13 about its pivot; if desired, a suitable joint or other means for allowing universal movement between the lug 33 and the end of the frame 9 may be provided at this point.

The lower portion of the frame 9 is provided with a plurality of cam faces 36, 37 and 38 adapted to engage the roller 26 carried by the subjacent carriage and thus cooperating with the shaft 8 to support the frame. From the arrangement of these cam faces as illustrated, it is apparent that the position in which the frame is supported on its pivot shaft 8 depends upon the longitudinal position of the carriage with respect to the frame and thus when the carriage is at the extreme left hand end of its travel, as shown in Fig. 2, the cam face 36 rests on the roller 26 whereby the adjacent portion of the frame is maintained in a relatively lowered position, thus bringing the top of the roller 32 somewhat below the level of the skid 30 at the opposite end of the frame. Movement of the carriage toward the right as viewed in Fig. 2, however, successively brings the roller 26 into engagement with the cam faces 37 and 38 and thus first gradually raises the roller 32 and correspondingly lowers the skid 30 as the roller 26 moves along the cam face 37 until it reaches the point of juncture between the faces 37 and 38 and thereafter slightly lowers the roller 32 as the roller 26 moves along the cam face 38.

The frame 10 is operative to support a pair of rolls 39 having their axes disposed longitudinally of the table, and at right angles to the axis of the roller 32, while the underside of the frame 10 is provided with cam faces 40, 41 and 42 adapted to engage the roller 26 between the cam faces 36, 37 and 38 on the frame 9, whereby the position of the frame 10, and consequently of the rolls 39, is also varied in accordance with the longitudinal position of the carriage.

Having thus described the construction of a preferred embodiment of one unit in the mill table of my invention, I shall now briefly indicate the manner of operation of a mill table comprising, for example, two of these units arranged in longitudinally spaced relation, as indicated in Fig. 1, and disposed in the vicinity of a machine (not shown) by means of which certain work is to be performed on the pipes or other work pieces while they are consecutively supported on the table. It will be understood that suitable skids S are arranged to extend angularly upward from the mill table to the source from which the pipes or other work pieces are supplied and that other downwardly inclined skids S' are similarly arranged to extend from the opposite side of the table to some point at which the pipes, after they have passed across the table, are to be collected for storage or the like. Thus the pipes can consecutively roll down the skids S from the source of supply to the table and, after crossing the latter, down the skids S' to the storage point; the skids may, of course, be of any preferred construction.

The carriages 24 of each unit are rigidly connected together by a shaft 28, the length of which is such as to permit proper spacing of the units and to maintain each of the carriages in the same longitudinal relation to its respective unit. A similar shaft 28' is extended from one of the unit carriages longitudinally outwardly from the end of the table and suitable actuating mechanism (not shown) provided for moving it axially so that both carriages 24 may be moved in unison longitudinally along their respective tracks. Now assuming that, as indicated in Figs. 2 and 3, the carriages are disposed at the extreme left hand ends of their paths of travel and thus engage the cam faces 36 and 40 of the frames 9 and 10 in each unit, the skids 30 thereof are above the level of the rolls 32 and 39 and a pipe P disposed on the table is therefore supported only by the skids 30 which, being inclined somewhat toward the left as viewed in Fig. 3 will cause the pipe P to roll off onto the skids S' on the left hand or discharge side of the table. After the pipe P has rolled free of the table, the carriages are moved toward the right and the frames 9 and 10, and consequently the arms 13, thus raised and the triggers 19 lowered through the action of the arms, thereby permitting the succeeding pipe P' to roll from the skids S onto the table. As the arms 13 are raised by the upward movement of the frames 9, the toes 16 engage a third pipe P'' so as to temporarily prevent it from moving further down the skids S and thus only a single pipe is released from the skids each time the triggers 19 are lowered. These triggers are desirably arranged so as to release the pipe P' only after the frames 9 have been moved about their pivots sufficiently for the concave rollers 32 to be raised above the level of the skids 30 and the pipe P' therefore rolls into and is retained in the concavities of the rollers 32 after its passage from the skids S. As these rollers are easily rotatable about their axes it is apparent that while the pipe is supported thereby as shown in Fig. 4, it may be readily moved longitudinally either manually or by a positive rotative movement imparted to the rollers by any suitable means, such, for example, as driving motors disposed within the roller shells and operable to rotate the rollers in either direction. If it is desired to rotate the pipe about its axis, preferably after it has been moved to the required position longitudinally, the carriages 24 are moved still further to the right and the frames 9 thereupon descend somewhat while the frames 10 are raised until the pipe is supported upon the rolls 39 as shown in Figs. 6 and 7 instead of on the rollers 32; as the rolls 39 are readily rotatable, the pipe may now be easily turned about its own axis.

After the machine work or other operations on the pipe have been completed and it is desired to clear the table to receive the succeeding pipe P", it is apparent that if the carriages are again moved to their extreme left hand position, thereby lowering the rollers 32 and rolls 39 and raising the skids 30 to their highest position, the pipe upon the table will be lifted by the skids 30 until it is clear of the said rollers and rolls and will be discharged from the table in the manner heretofore described while the toes 16 of the arms 13 will be lowered below the plane of the skids S and thus disengaged from the pipe P", allowing the latter to roll down the skids S into engagement with the triggers 19 preparatory to their release upon subsequent raising of the arms 13 to permit the pipe P" to pass onto the table.

It will thus be apparent that I have provided a mill table which, by the employment of a sufficient number of units, may be made long enough to afford proper support to work pieces of any length and by means of which the work pieces when disposed thereon may be readily moved longitudinally so as to bring them into proper relation with a machine designed to perform some mechanical operation thereon or for such other purposes as may be desired, or may be rotated about their axes to facilitate welding operations or for other purposes. It will further be apparent that the mill table of my invention is so constructed and may be so operated as to properly regulate the passage of the work pieces thereto and their discharge therefrom, while the design and arrangement of the various parts of the table are such as to reduce to a minimum the liability of breakage or of the table getting out of order under the conditions of use to which machines of the character of those to which my invention relates are necessarily subjected. Furthermore, the repair or replacement of any part of the table, if required, may be effected in a minimum of time, which is a matter of great importance under practical conditions of operation, since mill tables are ordinary employed for such purposes that any interference with their operation necessarily requires the shutting down of numerous other machines, furnaces and the like, with consequent loss of a great amount of time and money through the tying up of mechanism representing an investment many times greater than that of the mill table itself.

It will be understood that while I have herein described and illustrated with considerable particularity a preferred form of my invention, I do not thereby desire to intend to limit or confine myself specifically thereto as many modifications in the design, construction and arrangement of the several parts thereof may be made without departing from the spirit and scope of the invention as defined in the appended claims.

Having thus described my invention, I claim and desire to protect by Letters Patent of the United States:

1. A mill table comprising a base, a plurality of frames pivotally supported therefrom, a roller carried by one of said frames, a pair of rolls rotatably supported from another of said frames and having their axes substantially normal to the axis of the first mentioned roll, and means for effecting relative pivotal movement of said frames.

2. A mill table comprising a base, a pair of frames pivoted to the base for relative vertical movement about a common axis, a roller mounted on one of said frames for rotation about an axis parallel to the first mentioned axis, spaced rollers mounted on the other frame for rotation about axes substantially normal to said first mentioned axis, and means for effecting relative movement of said frames about said first mentioned axis.

3. A mill table comprising a base, a pair of frames pivoted to the base for relative vertical movement about a common axis, a roller mounted on one of said frames for rotation about an axis parallel to the first mentioned axis, spaced rollers mounted on the other frame for rotation about axes substantially normal to said first mentioned axis, and means disposed beneath the frames and operable to vary the relative vertically adjusted positions thereof.

4. A mill table comprising a base having spaced pedestals adjacent an end thereof, a pair of frames pivotally supported between said pedestals for movement about a common horizontal axis, each of said frames being provided with a cam surface, a roller carried by one of the frames and rotatable about an axis parallel to the first mentioned axis, a pair of spaced rolls carried by the other frame and respectively rotatable about axes substantially normal to the first mentioned axis, and a carriage movable on the base beneath the frames and adapted by engagement with said cam surfaces to vary the relative vertically adjusted positions of the frames with respect to each other as the carriage is moved along the base.

5. A mill table comprising a base, a pair of spaced pedestals adjacent each end of the base, a pair of frames pivoted between one pair of said pedestals for movement about a common horizontal axis and extending toward the other pair of pedestals, a roller mounted on one of said frames for rotation on an axis parallel to the first mentioned axis, a pair of spaced rolls mounted on the other frame for rotation respectively on axes substantially normal to the first mentioned axis, means disposed beneath the frames for rotating the frames about their pivotal axis to vary the relative vertical adjustment of the frames with respect to each other, and means associated with said other pair of pedestals and operable through the movement of one of said frames for controlling the passage of a work piece to said roller.

6. A mill table comprising a base having a pair of spaced pedestals adjacent an end thereof, a pair of frames respectively pivoted adjacent one end between said pedestals for relative vertical movement about a common axis, a roller mounted adjacent the free end of one of the frames for rotation on an axis parallel to the first mentioned axis, a skid formed on the opposite end of said frame adjacent but on the other side of said first mentioned axis from the roller, a pair of spaced rolls mounted on the other frame for rotation on axes substantially normal to the first mentioned axis, a carriage movable on the base in a path normal to the first mentioned axis, and cooperative means carried by the carriage and the frames adapted to vary the relative vertically adjusted position of the frames as the carriage is moved along the base whereby said roller may be elevated above the plane of the skid or the skid elevated above the plane of said roller and said rolls raised or lowered with respect to said roller.

7. In combination with means forming an inclined interrupted path for the movement of a work piece, a mill table disposed in the space forming the interruption in said path and comprising a base, a pair of relatively movable frames pivotally supported thereby and each provided with work piece supporting means, means for independently moving the frames vertically, a trigger bar adapted for interposition in said path to prevent the passage of a work piece to said supporting means, and means operable by the movement of one of said frames to move the trigger bar into and out of said path.

8. In combination with means forming an inclined interrupted path for the movement of a work piece, a mill table disposed in the space forming the interruption in said path and comprising a base, a pair of relatively movable frames pivotally supported thereby and each provided with work piece supporting means, means for independently moving the frames vertically, a trigger bar adapted for interposition in said path to prevent the passage of a work piece to said supporting means, and means comprising a pivoted arm interconnected with said trigger bar and vertically movable by one of said frames operative to actuate the trigger bar to control the passage of a work piece from said path to said work piece supporting means.

9. In combination with means forming an inclined interrupted path for the movement of a work piece, a mill table disposed in the space forming the interruption in said path and comprising a base, a pair of relatively movable frames pivotally supported thereby and each provided with work piece supporting means, means for independently moving the frames vertically, a trigger bar adapted for interposition in said path to prevent the passage of a work piece to said supporting means, means comprising a pivoted arm interconnected with said trigger bar and vertically movable by one of said frames operative to actuate the trigger bar to control the passage of a work piece from said path to said work piece supporting means, and means carried by said frame operative when said frame is moved so as to lower the trigger bar to form an inclined plane to facilitate the discharge of a work piece from said supporting means onto that portion of said path on the opposite side of the mill table from that portion which is controlled by the trigger.

10. A mill table comprising a base, a plurality of relatively movable frames supported therefrom and each having a cam surface, a roller disposed beneath said frames and adapted to engage said cam surfaces, and means operative to effect lateral translation of said roller to thereby effect simultaneous independent movement of the frames.

11. A mill table comprising a base, a plurality of relatively movable frames supported therefrom and each having a cam surface, supporting means disposed beneath the frames engageable with said cam surfaces, and means operative to effect movement of said first-mentioned means with respect to said surfaces to thereby effect independent relative movement of the frames.

12. A mill table comprising a base, a plurality of relatively movable work-supporting frames pivotally supported adjacent one end of the base and extending toward the other end thereof, said frames each having a cam surface, means disposed beneath said frames adapted to engage said cam surfaces to thereby afford vertical support to the frames, and means operable to effect horizontal translation of said last mentioned means to thereby effect independent relative vertical movement of said frames.

13. A mill table comprising a base, a frame pivoted thereto and having a cam surface, a carriage disposed beneath said frame and relatively movable with respect thereto, and means on said carriage cooperative with the cam surface on the frame to effect movement of the frame on its pivot when said carriage is moved relatively thereto.

LUTHER S. RESSER.